United States Patent [19]
Lahey et al.

[11] Patent Number: 6,058,247
[45] Date of Patent: May 2, 2000

[54] HEATING ELEMENT FOR UNPLUMBED STERILIZER

[75] Inventors: Francis J. Lahey, Durango; Steven C. Peake, Dubuque, both of Iowa; Dennis H. Smith, Marieta, Ohio

[73] Assignee: Barnstead/Thermolyne Corporation, Dubuque, Iowa

[21] Appl. No.: 08/957,716

[22] Filed: Oct. 24, 1997

[51] Int. Cl.[7] .............................. B01D 3/06; B01D 9/00; A21B 1/00; F27D 11/00

[52] U.S. Cl. .......................... 392/399; 219/401; 219/433; 422/307

[58] Field of Search ...................................... 392/399, 402, 392/403; 219/401, 402, 406, 407, 433, 434, 544, 548–549; 422/298, 307

[56] References Cited

U.S. PATENT DOCUMENTS

| | | | |
|---|---|---|---|
| 4,215,267 | 7/1980 | Kaebitzsch | 219/434 |
| 4,726,288 | 2/1988 | Lansing | 219/434 |
| 4,858,590 | 8/1989 | Bailey | 219/465.1 |
| 5,277,875 | 1/1984 | Albright et al. | 422/109 |
| 5,422,459 | 6/1995 | Zhou | 219/544 |

*Primary Examiner*—Sang Paik
*Attorney, Agent, or Firm*—Wood, Herron & Evans, L.L.P.

[57] ABSTRACT

An unplumbed sterilizer includes a heater having an electrical heating element disposed within a thermally conductive heater body. A conformable thermally conductive heat transfer plate is mounted between a mounting surface on the heater body and a heating surface on the sterilizing chamber. The heat transfer plate is effective to maintain a continuous mechanical contact between the heating and mounting surfaces. Further, a temperature sensor is attached to the heater body. By regulating the electrical power to the heating element as a function of the temperature of the heater body, the power applied to the heating element is maintained within specifications. Further, the heater body is mechanically attached to the sterilizing chamber by a single fastener resiliently applying a clamping force through the center of the heater body. In addition, the heater body is accessed simply by removing a cover plate from the outer body of the sterilizer.

31 Claims, 2 Drawing Sheets

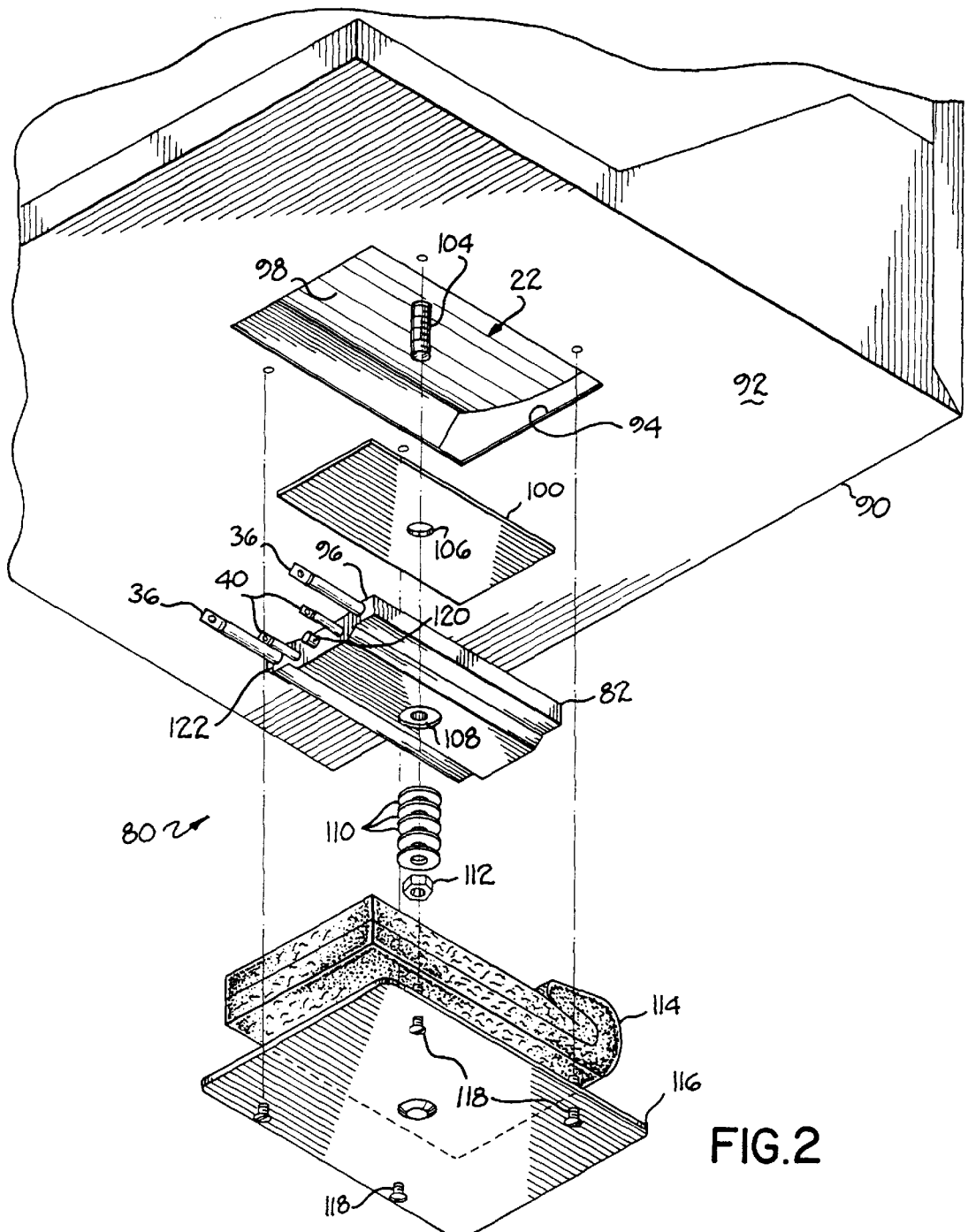
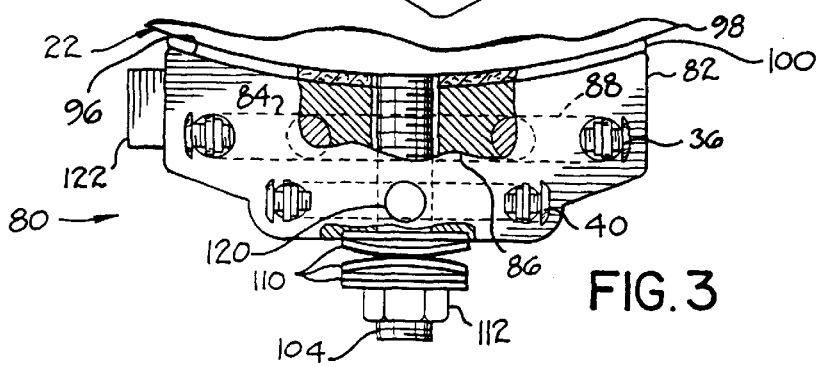

HEATING ELEMENT FOR UNPLUMBED STERILIZER

FIELD OF THE INVENTION

This invention relates generally to the field of sterilizers and, more particularly, to an improved heater for an unplumbed sterilizer.

BACKGROUND OF THE INVENTION

For purposes of this specification and claims, an "unplumbed sterilizer" is herein defined as a self-contained sterilizer having a) an internal liquid reservoir, b) a sterilizing chamber which is charged or filled with a preset volume of liquid, for example, water, from the reservoir to which the sterilizing chamber is fluidly connected, and c) a heater operatively connected with the sterilizing chamber which converts the liquid in the sterilizing chamber into a sterilizing fluid, for example, saturated steam. Since the sterilizing fluid is generated within the sterilizer, a sterilizer is not "plumbed" or connected to an external source of steam or other sterilizing fluid. Thus, unplumbed sterilizers are self contained and generally used as bench-top units in laboratories or the like. While the description herein will often refer to the liquid in the reservoir as water and the sterilizing fluid as steam, other liquids and sterilizing fluids may be used.

Many unplumbed sterilizers utilize a mica-type heater as the heating element. The heating element is held in place on the bottom of the sterilizing chamber by numerous bands, for example, two to six bands, extending around the perimeter of the sterilizing chamber. The ends of the bands are fastened or screwed together to hold the heater tightly in place. With such a heater, a thin sheet of mica is disposed between the heating element and the bottom of the sterilizing chamber. Heat is transferred from the heating element to the mica principally by radiation, and heat is most efficiently transferred from the mica to the sterilizing chamber by conduction. Thus, preferably, the mica must maintain a continuous and intimate contact with the bottom of the sterilizing chamber for optimum heat transfer. However, as the temperature of the chamber increases, the mica experiences a distortion; and at some locations, the mica will lose contact with the surface of the sterilizing chamber. Consequently, there is generally a nonuniform distribution and rate of transfer of heat between the heater and the bottom surface of the sterilizing chamber. Different areas or spots will transfer heat at different rates resulting in different temperatures, a nonuniform heating of the water. As the pool of water in the chamber shrinks, the nonuniform, or spot heating, is more apparent and can result in excess temperatures and superheated steam.

The nonuniform heat transfer to the chamber results in, on average, a less than desired rate of heat transfer from the heater into the chamber. Therefore, the heater must operate for longer periods of time. Typically, the temperature of the sterilizing chamber during the steam generation cycle is monitored by a heat sensor on the chamber, and the temperature is controlled by varying the power to the heater. In situations where the heat transfer is relatively poor, in order to maintain the desired temperature within the chamber, the heating element may be powered to levels exceeding its specified operating parameters. Either of the above conditions often shorten the life of heating element.

More recently, the mica-type heaters have been replaced by a heater assembly in which the electrical heating element is embedded in an aluminum casting that is shaped to conform to the bottom surface of the sterilizing chamber. The cast heater is held in place by a plurality of bands that wrap around the sterilizing chamber, the ends of which are fastened together to hold the heater in place. The cast aluminum heater has better heat transfer properties than the mica heater and, therefore, provides a more uniform heat transfer from the heater into the sterilizing chamber. However, with increased temperatures, the cast aluminum heater experiences a substantial expansion. That expansion, in conjunction with the rigid straps holding the heater in place, produces distortions and deflections which result in nonuniform contact between the heater casting and the bottom surface of the sterilizing chamber. Any such discontinuities of contact result in a less efficient rate of heat transfer from the heater into the chamber.

Thus, from the above, known heaters exhibit several deficiencies. First, during heating cycles, the expansion and contraction of the heater unit and the bottom surface of the sterilizer produce areas in which there is limited or no contact between the heater surface and the bottom surface of the sterilizing chamber. Further, such inconsistencies in surface contact area result in less than optimal rates of heat transfer from the heater into the chamber. In the steam generating cycle, such areas may produce hot spots within the chamber leading to unsaturated superheated steam. In the drying mode after the sterilizing process is complete, the relatively nonuniform and inconsistent heat transfer of known heaters may result in widely varying process times for the drying cycle. Further, such inefficiencies not only extend process cycle times, but require the heating element to be operated longer and at higher temperatures, thereby reducing cycle efficiency and heater life. Consequently, there is a need to provide an improved heater for an unplumbed sterilizer, which is more efficient and has a longer life.

A further disadvantage of prior heaters is that the multiplicity of band clamps are located around the sterilizing chamber between the sterilizing chamber and the outer body of the sterilizer. Thus, in the event of a heater element failure, to replace the heating element, the sterilizer must be substantially disassembled and then reassembled in addition to removing and reapplying the plurality of band clamps. Consequently, there is a need to provide a heater for an unplumbed sterilizer that is more easily maintained and replaced.

With prior systems, the temperature of the sterilizing chamber is monitored with a thermocouple or a resistance temperature device attached to the sterilizing chamber, and a sterilizer control modifies or changes the sterilizing chamber temperature by increasing or reducing electrical power to the heating element. With such systems, there is no control over whether power increases to the heating element are within the heating element specifications. Consequently, there is a need to better control the operation of the heater to extend its operating life.

SUMMARY OF THE INVENTION

The present invention provides an unplumbed sterilizer having a more efficient operating cycle. The improved efficiency is provided by a sterilizer having a more efficient steam generating cycle, as well as a more efficient drying cycle. The unplumbed sterilizer of the present invention further has an improved heater that provides more efficient heat transfer into the sterilizing chamber. Thus, in the steam generating cycle, saturated steam is generated more quickly, and the average temperature, as well as the maximum temperature of the heating element during a heating cycle, is lowered. Those improvements lead to the further advantage of lengthening the useful life of the heating element. Therefore, the unplumbed sterilizer of the present invention has the further advantages of operating more efficiently, less expensively, and more reliably.

In accordance with the principles of the present invention and in accordance with the described embodiments, the unplumbed sterilizer has a sterilizing chamber for receiving a load to be sterilized and further receiving a quantity of sterilizing liquid. The sterilizer includes a heater having an electrical heating element disposed within a thermally conductive heater body. A conformable thermally conductive heat transfer plate is mounted between a mounting surface on the heater body and a heating surface on the sterilizing chamber. The heat transfer plate, which in a preferred embodiment is flexible graphite material, is effective to maintain a continuous mechanical contact between the heating and mounting surfaces, thereby optimizing the transfer of heat from the heater body to the sterilizing chamber.

In another embodiment of the invention, a temperature sensor is attached to the heater body and provides a heater body temperature signal. In one aspect of the invention, the temperature signal is provided to the sterilizer control, which regulates the electrical power applied to the heating element as a function of the heater body temperature signal. By regulating the electrical power to the heating element as a function of the temperature of the heater body, the probability of applying too much power to the heating element is minimized with the advantage of increasing the useful life of the heating element.

In accordance with another embodiment of the invention, the heater body is mechanically attached to the sterilizing chamber by a single fastener extending generally through the center of the heater body. In accordance with one aspect of this embodiment, the fastener resiliently applies a predetermined force to the heater body. The combination of the single, centrally located fastener, which resiliently applies a clamping force permits the heater body and sterilizing chamber to independently expand and contract as a function of the heating and cooling cycles, thereby advantageously maintaining an optimum heat transfer throughout the heating cycle.

In another aspect of the invention, the heater body may be accessed simply by removing a cover plate from the outer body of the sterilizer. Further, by removing the cover plate and the single fastener, the heater may be easily and quickly removed for maintenance and replacement purposes.

These and other objects and advantages of the present invention will become more readily apparent during the following detailed description together with the drawings herein.

BRIEF DESCRIPTION OF THE DRAWINGS

FIG. 2 is a disassembled view of the heating element assembly in accordance with the principles of the present invention.

FIG. 3 is a an partial end view of the heating element assembly attached to the sterilizing chamber.

DETAILED DESCRIPTION OF THE INVENTION

Figure 1:
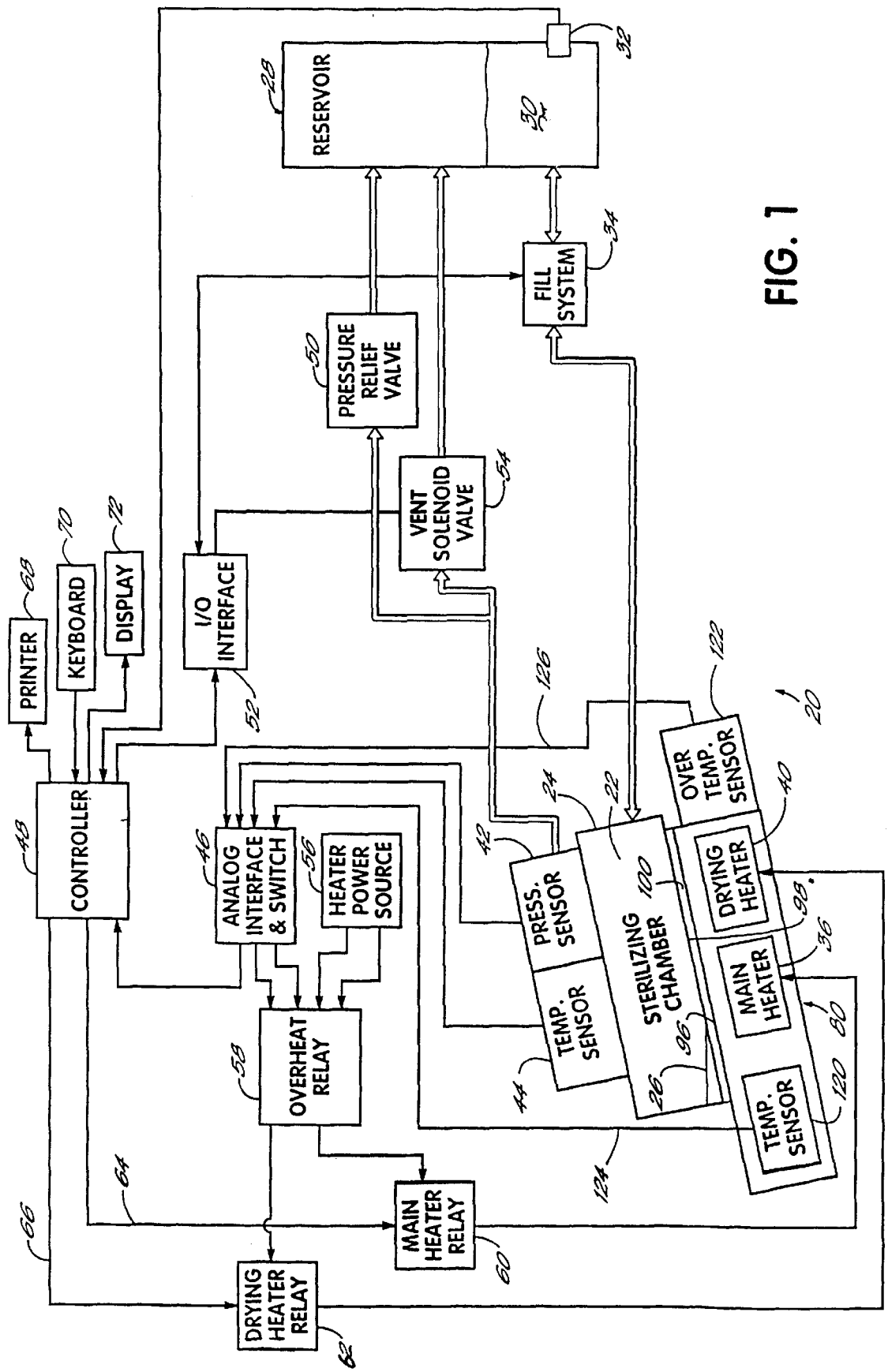
FIG. 1 is a schematic block diagram of a sterilizer constructed in accordance with the principles of the present invention.

Referring to FIG. 1, a sterilizer 20 has a generally cylindrical sterilizing chamber 22 with a hinged door 24 on the front thereof through which a load, for example, articles or materials to be sterilized, are placed into and removed from the sterilizing chamber 22. Often, the sterilizing chamber 22 is mounted at a slight incline with respect to the horizontal so that any liquid within the sterilizing chamber will flow to the rear bottom portion 26 of the sterilizing chamber 22. The sterilizer 20 further includes a reservoir 28 which is filled with water 30. The reservoir can be filled manually or is filled automatically in response to output signals from a water level detection switch 32 that detects high and low water levels within the reservoir 28.

Prior to a sterilizing cycle, a volume of water is transferred from the reservoir 28 through a fill system 34 and into the sterilizing chamber 22. The water collects at the bottom section 26. A main, steam generating electrical heater 36, which is in the range of 1500 watts, is turned ON to vaporize the water into sterilizing, saturated steam which pressurizes the sterilizing chamber 22 and sterilizes items within the chamber 22. Thereafter, electrical drying heater 40, in the range of 400 watts, is used to dry the sterilized articles or material in a known manner. A pressure sensor 42 and a temperature sensor 44 provide respective pressure and temperature output signals to an analog interface and switch circuit 46 that, in turn, provides the temperature and pressure signals to a controller 48. The controller 48 is preferably a microprocessor-based programmable controller with arithmetic and logic capabilities. The controller 48 controls the sterilizing cycle in accordance with the temperature and pressure output signals. In addition, a pressure relief valve 50 will respond to excessively high pressure in the sterilizing chamber 22 and open the chamber to the reservoir 28 in response to the pressure exceeding the pressure relief valve setting. In a known manner, the controller 48 provides a control signal to an I/O interface 52 to operate a vent solenoid valve 54 at the end of the sterilizing cycle to vent the sterilizing steam back to the reservoir or a recovery chamber.

A heater power source 56, for example, a source of AC power, is connected to an overheat relay 58. Under normal conditions, the overheat relay 58 is operated by the circuit switch 46 to connect power from the heater power source 56 to a main heater relay 60 and drying heater relay 62. The relays 60, 62 are preferably solid state relays and have input control signals connected to outputs of the controller 48. If the controller 48 provides a main heater ON signal on line 64, the main relay 60 closes connecting power to the main heater 36. Similarly, if the controller 48 provides a drying heater ON signal on line 66, the drying heater relay 62 connects heater power to the drying heater 40. A printer 68, keyboard 70 and display 72 may be connected to the controller 48 depending upon the requirements of the sterilizer 20. The keyboard 70 is used by an operator to provide process information to the controller 48. For example, parameters for different types of sterilization cycles with associated pressures, temperatures and timing parameters can be input or programmed into the controller 48 using the keyboard 70. The display 72 is used to display the information being input by the operator and also displays the active cycle and associated parameters during a sterilization cycle. The printer 68 can be used to print out the process variable values that are used during a sterilization cycle.

FIGS. 2 and 3 illustrate the heater system 80 of the present invention in more detail. The main heating element 36 and a drying heating element 40 are disposed within a heater block 82. Normally, the main heater 36 extends in a serpentine pattern within the heater block 82 to form, for example, three contiguous U-shaped sections 84, 86, 88. Normally, the drying heater 40 extends in a single U-shaped pattern in the heater block 82. The heater block 82 may be made of aluminum, copper, silver, or other material having a relatively high thermal conductivity. Further, the heater block 82 may be molded, cast, machined from a solid, etc. The heater block 82 may be molded or cast around the heating elements 36, 40. Alternatively, the heater block 82 may be made with slots having shapes conforming to the shapes of the heating elements 36, 40 and the heating elements then cemented or mechanically fastened, for example, staked, within the slots. Whatever the fabrication process, the heating elements 36, 40 should be in continuous intimate contact with the heater block 82 so that there is optimum heat transfer from the heating elements 36, 40 to the heater block 82.

The generally tubular sterilizing chamber 22 is surrounded by a sterilizer housing 90, which is designed to support the chamber 22 therein. The bottom surface 92 of the housing 90 has an opening 94 having a shape generally corresponding to the shape of the heater block 82. Further, the heater block 82 has an upper mounting surface 96, which is curved in shape to conform to the curvature in the lower heating surface 98 of the sterilizing chamber 22. Ideally, the entire area of the surface 96 should remain in intimate contact with a common area on the lower surface 98 throughout the heating cycle. However, as earlier described, heating of the block 82 will result in unpredictable distortions, which may result in a loss of direct contact between adjacent portions of the surfaces 96 and 98. Such loss of direct contact may result in hot spots on the surface 98, as well as a general reduction in heating efficiency.

To improve the direct contact and heat transfer across the complete areas of the surfaces 96 and 98, a conformable, thermally conductive heat transfer plate 100 is interposed between the surfaces 96 and 98. The plate 100 is preferably made from a flexible graphite material, for example, a material designated CR50–15NA commercially available from Warth International, but may be made from any other conformable material having a relatively high thermal conductivity. The conformable plate 100 effectively maintains a direct contact between the surfaces 96 and 98, even though the heater block 82 experiences some distortions in size and shape during the heating cycle. The conformable transfer plate 100 improves the heat transfer, so that more heat is introduced more quickly into the sterilizing chamber, thereby more quickly providing the sterilizing steam. Further, the average temperature of the heating element 36, as well as its maximum temperature over a heating cycle is lower. The deformation of the transfer plate 100 allows the heater block 82 and/or the adjacent surface 98 of the sterilizer cylinder to deflect and deform while still maintaining intimate, physical contact with the transfer plate 100 required to provide maximum heat transfer between the heater block and the sterilizer. The heat transfer plate 100 also improves the efficiency of the drying cycle. For the same reasons as discussed above, generally higher average dry temperatures are experienced without overworking the drying heater 40, thereby improving the efficiency of the drying process.

The heater block 82 and transfer plate 100 are held in place against the bottom surface 98 of the sterilizing chamber 22 by a mechanical fastener, for example, the threaded stud 104, which is attached to the bottom surface 98 of the sterilizing chamber 22. The stud 104 is located approximately at the center of the opening 94 and extends through a mounting hole 106 in the transfer plate 100, as well as a mounting hole 108 within the heater block 82. A number, for example, five, washers 110 are mounted over the stud 104 between the heater block 82 and a nut 112 that secures the heater block 82 and transfer plate 100 against the lower surface 98 of the sterilizing chamber 22. The washers 110 are a combination of Bellville and flat washers, for example, two Belville washers and three flat washers. The combination of washers 110 allows for thermal expansion of the various components mounted on the stud 104. Removable resilient insulating material 114 is inserted over the heater block 82 within the opening 94 and a cover plate 116 is attached to the lower surface 92 of the housing 90 by means of fasteners 118 in order to cover the opening 94.

The above heater mounting assembly provides substantial advantages over prior designs in which the heater is secured against the sterilizing chamber 22 by annular straps. With those earlier designs, to inspect, maintain or replace the heater, the sterilizing housing has to be separated from the sterilizing chamber, and thereafter, the ends of the numerous annular straps holding the heater in place must be separated by removing screws or other fasteners. After the heater is replaced, the straps must be reapplied, and the sterilizing chamber reassembled within the housing. In contrast to the above, with the heater assembly illustrated in FIG. 2, the heater block 82 is accessed by simply removing the fasteners 118, cover plate 116, and insulating blanket 114. Thereafter, the heater may be removed by removing a single nut 112 from the stud 104. Therefore, the assembly illustrated in FIG. 2 provides a substantial improvement in convenience to the user of the sterilizer.

The performance of the heaters 36, 40 is further improved by the utilization of a temperature sensor 120, for example, a resistance temperature device and an over temperature sensor 122, for example, a bimetallic thermal switch. The controller 48 (FIG. 1) detects the temperature of the sterilizing chamber 22 by means of temperature sensor 44 and regulates the temperature within the sterilizing chamber 22 by energizing and de-energizing the heaters 36, 40. The temperature sensor 120 provides a signal on line 124 to the controller 48 via the analog interface 46, representing the temperature of the heater block 82. The controller 48 operates the heater relays 60, 62 to operate the respective heaters 36, 40 so that the heaters stay within their specified temperature ranges. In the event of the temperature sensor 120 does not function properly, the over-temperature sensor 122 provides a signal over line 126 to the controller 48 via the interface 46 to cause the controller 48 to turn the heaters OFF. By maintaining the heaters 36, 40 within their specified temperature ranges, the life of each of the heaters 36, 40 is extended. Further, the process control of the heating cycles, as well as the overall sterilizing cycle is also improved.

In use, articles to be sterilized are placed in the sterilizing chamber 22 and a sterilizing cycle is initiated. The controller 48 operates the fill system 34 to transfer a precise volume of water from the reservoir 28 to the sterilizing chamber 22. Thereafter, the controller 48 energizes the main heater relay 60 to turn ON the main heater 36. The main heater 36 transfers heat to the heater block 82, the heat transfer plate 100, and into the bottom surface 98 of the sterilizing chamber 22. The conformable heat transfer plate 100 is effective to maintain the heater block 82 in substantially immediate direct contact with the bottom surface 98, even though the heater block 82 may experience some distortion from the heating cycle. In addition, during the heating cycle, controller 48 monitors the temperature sensor 120 coupled to the main heater 36, as well as the temperature sensor 44 coupled to the sterilizing chamber 22. By directly monitoring the temperature of the heater block 82 with the sensor 120, the controller 48 is able to modulate the operation of the heater relay 60 to optimize the supply of electrical current to the heater 36. Thus, the heater 36 can be precisely operated to provide maximum heat without exceeding its specified temperature limits. Similarly, during a drying cycle, the controller 48, in response to the temperature sensors 44 and 120, modulates the operation of the heater relay 62, thereby modulating the operation of the drying heater 40 to optimize the drying, heating cycle. Once again, the drying heater 40 is operated to provide maximum heat without exceeding its specified maximum temperature. Thus, the temperature sensor 120 permits the supply of current to the heaters 36, 40 to be optimized, thereby providing a more efficient heating cycle, while at the same time, extending the lives of the heaters 36, 40.

If at any time, maintenance of the heating elements is required, for example, to check the electrical connections thereto, the user simply inverts the sterilizer 20, removes the screws 118, cover plate 116, and insulating plate 114. Thereafter, the heating elements 36, 40 are exposed and may be inspected and maintained. The heating elements 36, 40 and heater block 82 may be replaced by simply removing the nut 112 and washers 110 and thereafter, lifting the heater block 82 from the stud 104. The heater assembly is easily reinstalled by reversing the above process. Thus, maintenance and replacement procedures are substantially reduced over existing designs which require major disassembly of the sterilizer 20 and removal of various band clamps holding the heater in place.

While the invention has been set forth by a description of the preferred embodiment in considerable detail, it is not intended to restrict or in any way limit the claims to such detail. Additional advantages and modifications will readily appear to those who are skilled in the art. For example, while it is preferred to attach the heater block 82 with a single bolt, the heater block may be sufficiently long that two bolts are preferably used to attach the heater block to the sterilizer. Further, the single bolt may be replaced with the known bands for strapping the heater block 82 to the bottom surface 98 of the sterilizer with the heat transfer plate 100 located therebetween. The controller of FIG. 1 is described as a digital processor; however, the temperature sensors and control loops may alternatively be provided with an analog control chip, a bimetal device, a hydraulic switch, etc. The invention, therefore, in its broadest aspects, is not limited to the specific details shown and described. Consequently, departures may be made from the details described herein without departing from the spirit and scope of the claims which follow:

What is claimed is:

1. An unplumbed sterilizer having a sterilizing chamber for receiving a load to be sterilized and a quantity of sterilizing liquid, the unplumbed sterilizer comprising:
    a heating surface on the sterilizing chamber;
    a heater operatively connected to the sterilizing chamber, the heater having
        a thermally conductive heater body having a mounting surface conforming to and mounted adjacent the heating surface on the sterilizing chamber;
        an electrical heating element disposed within the heater body;
        a flexible, thermally conductive, heat transfer plate mounted between the heater body and the sterilizing chamber, the heat transfer plate having
            a first surface in intimate contact with substantially all of the mounting surface of the heater body, and
            a second surface in intimate contact with substantially all of the heating surface of the sterilizing chamber; and only a single fastener mechanically connecting the heater body and heat transfer plate to the sterilizing chamber.

2. The unplumbed sterilizer of claim 1 wherein the heater body is aluminum.

3. The unplumbed sterilizer of claim 2 wherein the heater body is cast aluminum.

4. The unplumbed sterilizer of claim 1 wherein the heating element is in intimate contact with the heater body.

5. The unplumbed sterilizer of claim 1 wherein heating element is molded into the heater body.

6. The unplumbed sterilizer of claim 1 wherein heating element is cemented into the heater body.

7. The unplumbed sterilizer of claim 1 wherein mounting surface is substantially shaped to conform to the shape of the heating surface.

8. The unplumbed sterilizer of claim 1 wherein heat transfer plate is made from a conformable material.

9. The unplumbed sterilizer of claim 1 wherein the heat transfer plate is made from a flexible graphite sheet.

10. The unplumbed sterilizer of claim 1 wherein the heat transfer plate is made from a material that maintains the intimate contact with the mounting and heating surfaces as the temperature of the heater body and sterilizing chamber rises.

11. The unplumbed sterilizer of claim 1 wherein the heat transfer plate is made from a material that maintains the intimate contact with the mounting and heating surfaces as the rising temperature from the heating element causes the heater body and sterilizing chamber to deform and deflect.

12. The unplumbed sterilizer of claim 1 wherein the fastener is located approximately at the center of the heater body.

13. The unplumbed sterilizer of claim 1 wherein the fastener holds the heater body and the heat transfer plate against the heating surface with a predetermined force.

14. The unplumbed sterilizer of claim 1 wherein the fastener holds the heater body and the heat transfer plate against the heating surface with a resiliently applied predetermined force.

15. The unplumbed sterilizer of claim 1 wherein the fastener is tightened to a predetermined force of approximately 80 foot pounds of torque.

16. The unplumbed sterilizer of claim 15 wherein a resilient member is located between the fastener and the heater body.

17. The unplumbed sterilizer of claim 16 wherein the resilient member is a Belleville spring.

18. The unplumbed sterilizer of claim 16 wherein the resilient member is a plurality of Belleville springs.

19. The unplumbed sterilizer of claim 1 wherein a temperature sensor is located within the heater body to measure temperature of the heating element.

20. The unplumbed sterilizer of claim 19 wherein the temperature element is connected to a sterilizer control for regulating electrical power applied to the heating element.

21. An unplumbed sterilizer having a sterilizing chamber for receiving a load to be sterilized and a quantity of sterilizing liquid, the unplumbed sterilizer comprising:
    a heater operatively connected to the sterilizing chamber, the heater having
        a thermally conductive heater body having a mounting surface adapted to be mounted adjacent a heating surface on the sterilizing chamber;
        an electrical heating element disposed within the heater body;
    a first temperature sensor mounted in a heat transfer relationship with the sterilizing chamber for providing a sterilizing chamber temperature signal representing a temperature within the sterilizing chamber;

a second temperature sensor mounted directly on the heater body for providing a heater temperature signal representing an operating temperature of the heater body below an over-temperature value of the heater body; and a third temperature sensor mounted directly on the heater body for providing an over-temperature signal representing the over-temperature value of the heater body; and a heater control connected to the temperature sensors and the heating element, the heater control energizing and de-energizing the heating element in response to both the sterilizing chamber and heater temperature signals to maintain the sterilizing chamber at a desired operating temperature and to simultaneously maintain the heater below the over-temperature, the heater control de-energizing the heating element in response to the over-temperature signal.

22. An unplumbed sterilizer having a sterilizing chamber for receiving a load to be sterilized and a quantity of sterilizing liquid, the unplumbed sterilizer comprising:

a heating surface on the sterilizing chamber;

a heater operatively connected to the sterilizing chamber, the heater having a thermally conductive heater body having a mounting surface adapted to be mounted adjacent the heating surface on the sterilizing chamber;

an electrical heating element disposed within the heater body; and only one fastener extending through the approximate center of the heater body and connected to the approximate center of the heating surface of the sterilizing chamber, the fastener securing the heater to the sterilizing chamber.

23. The unplumbed sterilizer of claim 22 wherein the fastener applies a predetermined force to the heater body.

24. The unplumbed sterilizer of claim 22 wherein the fastener resiliently applies a predetermined force to the heater body.

25. The unplumbed sterilizer of claim 22 wherein Belleville springs are disposed between fastener and heater body.

26. The unplumbed sterilizer of claim 25 further comprising:

an outer body surrounding the sterilizing chamber, the outer body containing an opening in the proximity of the location of the heater body on the sterilizer and shaped to permit the heater body to pass therethrough;

a cover plate sized to fit over the opening; and fasteners for securing the cover plate to the outer body, thereby covering the opening.

27. A heater for an unplumbed sterilizer having a heating surface, the unplumbed sterilizer having a sterilizing chamber for receiving a load to be sterilized and a quantity of sterilizing liquid, the heater being operatively connected to the sterilizing chamber to create a sterilizing fluid within the sterilizing chamber, the heater comprising:

a thermally conductive heater body having a mounting surface conforming to and mounted adjacent the heating surface on the sterilizing chamber;

an electrical heating element disposed within the heater body; and a flexible, thermally conductive, heat transfer plate mounted between the heater body and the sterilizing chamber, the heat transfer plate having a first surface in intimate contact with substantially all of the mounting surface of the heater body, a second surface in intimate contact with substantially all of the heating surface of the sterilizing chamber; and only a single fastener mechanically connecting the heater body and heat transfer plate to the sterilizing chamber.

28. The heater of claim 27 further comprising a spring resiliently urging the heater body toward the heating surface of the sterilizing chamber to maintain the first and second surfaces in intimate contact with the heater body mounting surface and the second surface is in intimate contact with the heating surface of the sterilizing chamber.

29. A method of operating an unplumbed sterilizer comprising:

providing an unplumbed sterilizer having a sterilizing chamber with a heater mounted in a heat transfer relationship with the sterilizing chamber;

placing a load in the sterilizing chamber;

transferring a quantity of sterilizing fluid to the sterilizing chamber;

applying electrical power to the heater to initiate a sterilizing cycle;

measuring an operating temperature of the sterilizing chamber with a first temperature sensor connected to the sterilizing chamber;

measuring an operating temperature of the heater less than an over-temperature with a second temperature sensor mounted directly to the heater;

measuring the over-temperature of the sterilizing chamber with a third temperature sensor mounted directly on the heater;

energizing and de-energizing the heater during the sterilizing cycle as a function of the operating temperature of the heater to maintain the temperature of the heater below the over-temperature;

simultaneously energizing and de-energizing the heater during the sterilizing cycle as a function of the operating temperature of the sterilizing chamber to maintain the temperature of the sterilizing chamber at a desired temperature; and de-energizing the heater during the sterilizing cycle in response to the third temperature sensor detecting an over-temperature of the heater.

30. A method of constructing an unplumbed sterilizer comprising:

providing an unplumbed sterilizer having a thermally conductive heater body with a mounting surface mounted adjacent a heating surface of a sterilizing chamber;

positioning a thermally conductive, flexible member between the heating surface of the sterilizing chamber and the mounting surface of the heater body with one surface of the flexible member being in a conductive heat transfer relationship with the heating surface and an opposite surface of the flexible member being in a conductive heat transfer relationship with the mounting surface; and mechanically connecting the heater body and heat transfer plate to the sterilizing chamber with only a single fastener.

31. The method of claim 30 further comprising resiliently biasing the heater body toward the heating surface with the conformable member sandwiched therebetween.

* * * * *